United States Patent
Sumpf et al.

(10) Patent No.: US 9,577,227 B2
(45) Date of Patent: Feb. 21, 2017

(54) CELL MODULE ASSEMBLIES

(71) Applicant: Tesla Motors, Inc., Palo Alto, CA (US)

(72) Inventors: Robert D. Sumpf, San Francisco, CA (US); Ernest Villanueva, Mountain View, CA (US); David E. Hegeman, San Jose, CA (US); Satvik Vipin Batavia, Newark, CA (US); Ganesh Singh, Westbloomfield, MI (US); Alex Prilutsky, San Mateo, CA (US); Scott I. Kohn, Redwood City, CA (US); Bruce P. Edwards, Menlo Park, CA (US); Peter Tennessen, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 326 days.

(21) Appl. No.: 14/056,552

(22) Filed: Oct. 17, 2013

(65) Prior Publication Data

US 2015/0111082 A1    Apr. 23, 2015

(51) Int. Cl.

| | |
|---|---|
| *H01M 10/6555* | (2014.01) |
| *H01M 10/6567* | (2014.01) |
| *H01M 10/6557* | (2014.01) |
| *H01M 10/625* | (2014.01) |
| *H01M 2/10* | (2006.01) |
| *H01M 10/643* | (2014.01) |

(52) U.S. Cl.
CPC ......... *H01M 2/105* (2013.01); *H01M 2/1077* (2013.01); *H01M 10/643* (2015.04); *H01M 10/6557* (2015.04)

(58) Field of Classification Search
CPC ............... H01M 2/105; H01M 2/1077; H01M 10/6557; H01M 10/643; H01M 10/6555; H01M 10/6567; H01M 10/625; H01M 10/5055; H01M 10/5016; H01M 10/5075; H01M 10/5059
USPC ........................................................ 429/120
See application file for complete search history.

(56) References Cited

U.S. PATENT DOCUMENTS

| | | | |
|---|---|---|---|
| 3,784,411 A * | 1/1974 | Ciliberti, Jr. .......... | H01M 2/105 429/157 |
| 2006/0078789 A1* | 4/2006 | Wegner ............... | H01M 10/625 429/120 |
| 2007/0009787 A1 | 1/2007 | Straubel et al. | |
| 2008/0311468 A1 | 12/2008 | Hermann et al. | |
| 2009/0023056 A1 | 1/2009 | Adams et al. | |
| 2010/0092849 A1 | 4/2010 | Wood et al. | |

(Continued)

OTHER PUBLICATIONS

International Search Report, PCT/US2014/060674, Jan. 26, 2015, 12 pages.

*Primary Examiner* — Karie O'Neill Apicella
(74) *Attorney, Agent, or Firm* — Garlick & Markison; Bruce E. Garlick

(57) ABSTRACT

A method includes: assembling a thermal-exchange tube in a module housing for an energy storage pack; assembling cells in the module housing, wherein the thermal-exchange tube runs between rows of the cells; applying an adhesive that affixes the cells and the thermal-exchange tube to the module housing; curing a first portion of the adhesive by radiation, wherein a second portion of the adhesive is shielded from the radiation by the cells or the thermal-exchange tube; and curing at least the second portion of the adhesive by a chemical cure mechanism.

17 Claims, 11 Drawing Sheets

(56) References Cited

U.S. PATENT DOCUMENTS

| | | |
|---|---|---|
| 2010/0104938 A1 | 4/2010 | Hermann |
| 2010/0151308 A1 | 6/2010 | Hermann et al. |
| 2011/0091760 A1 | 4/2011 | Straubel et al. |
| 2011/0165446 A1 | 7/2011 | Hermann |
| 2011/0212356 A1 | 9/2011 | Tennessen et al. |
| 2011/0214808 A1* | 9/2011 | Hermann ............... H01M 2/08 156/275.5 |
| 2012/0030932 A1 | 2/2012 | Hermann et al. |
| 2012/0037310 A1 | 2/2012 | Hermann et al. |
| 2012/0161472 A1 | 6/2012 | Rawlinson et al. |
| 2013/0196184 A1 | 8/2013 | Faass et al. |

* cited by examiner

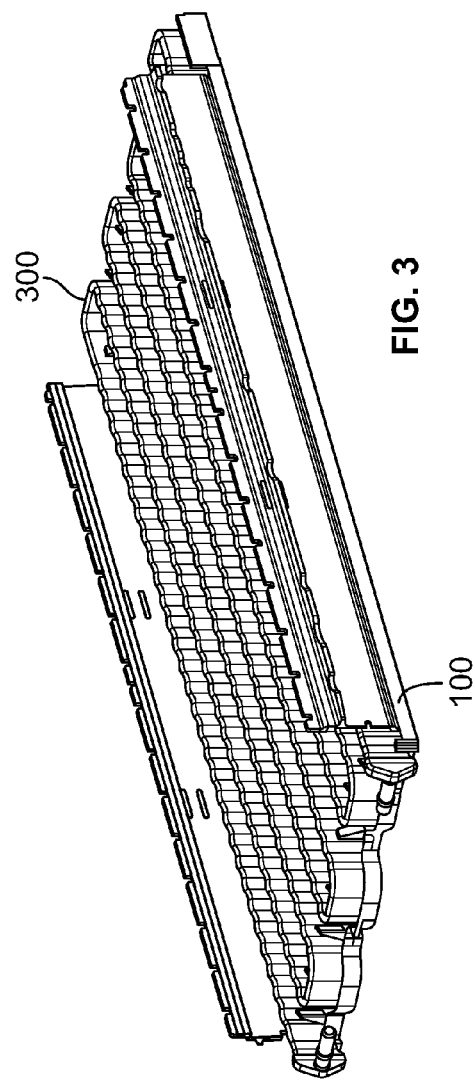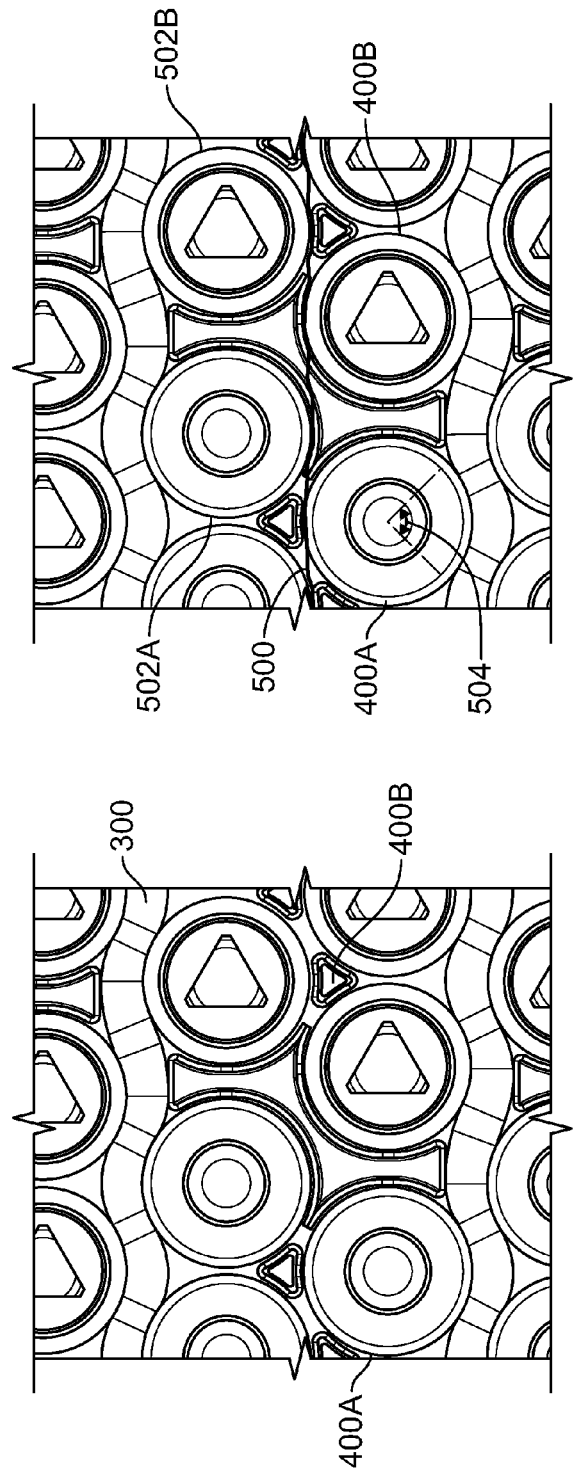

CELL MODULE ASSEMBLIES

BACKGROUND

Some energy storage systems (e.g., battery packs) pump a cooling fluid through a cooling tube in between or near the energy-storing cells. One aspect of the thermal architecture of such an energy storage system is the thermal resistance between the cells and the heat transfer fluid contained within the cooling tube. Thermal interface materials (TIMs) can be used for bridging the physical gap between the cell and the cooling tube. In the past, cells have been populated inside a plastic housing, a straight cooling tube has been run between cell rows, and the interior has been flooded with a thermally conductive epoxy. Such epoxy may be high-cost and high-mass, with large conduction path lengths. In another approach, appropriate thermal resistance has been obtained using a high-cost, compressible silicone sponge TIM applied to a scalloped cooling tube.

SUMMARY

In a first aspect, a method includes: assembling a thermal-exchange tube in a module housing for an energy storage pack; assembling cells in the module housing, wherein the thermal-exchange tube runs between rows of the cells; applying an adhesive that affixes the cells and the thermal-exchange tube to the module housing; curing a first portion of the adhesive by radiation, wherein a second portion of the adhesive is shielded from the radiation by the cells or the thermal-exchange tube; and curing at least the second portion of the adhesive by a chemical cure mechanism.

Implementations can include any or all of the following features. The adhesive is an acrylate epoxy adhesive. The thermal-exchange tube is a scalloped thermal-exchange tube, and the cells datum to the module housing by the scalloped thermal-exchange tube and not by the module housing. The method further includes adding a cell spreader element between at least some adjacent cells. The method further includes assembling a mount in a slot on an edge of the module housing, wherein the adhesive affixes also the mount to the module housing. The method further includes positioning the mount on the module housing using ribs in the slot. The method further includes attaching the module housing to a member of the energy storage pack using a flange on the mount. The member has a split to accommodate at least the flange, and the split is level with a center of mass for the assembly of the module housing, the thermal-exchange tube, the cells and the adhesive. The method further includes providing a crumple zone between the module housing and an enclosure of the energy storage pack.

In a second aspect, an energy storage pack includes: a module housing; cells; and a thermal-exchange tube running between rows of the cells, wherein the cells and the thermal-exchange tube are affixed to the module housing by an adhesive, a first portion of the adhesive being cured by applied radiation, wherein a second portion of the adhesive is shielded from the radiation by the cells or the thermal-exchange tube, and wherein the second portion of the adhesive is cured by a chemical cure mechanism.

Implementations can include any or all of the following features. The thermal-exchange tube is a scalloped thermal-exchange tube, the cells datum to the module housing by the scalloped thermal-exchange tube and not by the module housing, and the energy storage pack further includes a cell spreader element added between at least some adjacent cells. The module housing includes structure that reflects respective shapes of the cells and that is oversized relative to the cells, and the adhesive fills gaps between the cells and the structure in affixing the cells to the module housing. The structure includes three triangle shapes on one half of a footprint of each cell. The thermal-exchange tube has an elongate cross section with two essentially parallel main side surfaces, the thermal-exchange tube has internal ribs that connect the main side surfaces to each other, and the internal ribs are non-perpendicular to the main side surfaces. Each of the internal ribs curves outward toward a nearest edge of the thermal-exchange tube. Each of the internal ribs is straight and slanted relative to the main side surfaces. The thermal-exchange tube is made of aluminum or a polymer. The module housing is configured to accept at least two different types of cells. The module housing is configured to have non-energy placeholders instead of some of the cells which reduces a capacity of the energy storage pack. The module housing is configured to receive at least some of the cells in each of multiple alternative orientations. The energy storage pack is configured to be positioned on a lower cross-member of an enclosure, and the energy storage pack is held in place by at least one pin before the energy storage pack is mechanically restrained by an upper cross-member.

BRIEF DESCRIPTION OF DRAWINGS

FIG. 3 shows an example of a thermal-exchange tube assembled in the module housing of FIG. 1.

FIG. 4 shows an example of the thermal-exchange tube of FIG. 3 running between rows of cells assembled in the module housing.

FIG. 5 shows an example of a cell spreader element between rows of the cells from FIG. 4.

DETAILED DESCRIPTION

This document describes systems and techniques involving modules for cells of an energy storage pack, such as a battery pack. Modules can be used with mounts for attaching them in the battery pack. A thermal-exchange tube—i.e., a cooling and/or heating tube—can be provided so that each cell datums to the module housing by the tube, rather than by structure in the housing. The tube can be affixed to the module housing using the same application of adhesive as the cells, and radiation (e.g., UV light) can be used for adhesive curing. For areas where the applied adhesive is shadowed from the radiation, a secondary cure mechanism can be used. The module housing allows flexibility in use of cells, for example accepting cells of different types, cells in different positions, or placeholders instead of some cells. The tube can be provided with internal ribs that are curved or slanted to improve manufacturability and thermal/fluid performance when sharp bends are made in the tube.

Figure 1:
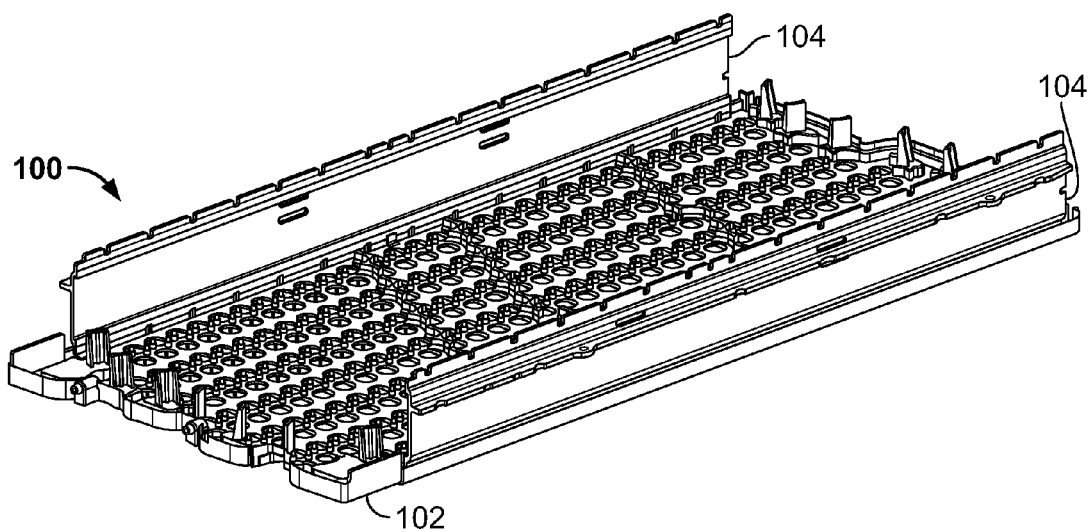
FIG. 1 shows an example of a module housing that includes a clamshell and mounts.

FIG. 1 shows an example of a module housing 100 that includes a clamshell 102 and mounts 104. The clamshell is configured for holding cells that are assembled into a battery pack. The battery pack of an electric vehicle can consist of an overall enclosure (not shown), inside which one or more modules based on the module housing 100 are to be mounted after being assembled.

The clamshell 102 can be made from any suitable material, including, but not limited to, metal, polymer or a composite. In some implementations, the clamshell 102 is considered a "non-terminal side" clamshell. The term non-terminal side here refers to one end of the module (sometimes considered the lower end) that does not have connection points for interconnecting multiple modules into a pack. By contrast, another clamshell on the opposite side of the module can then be characterized as a "terminal side" clamshell.

The mounts 104 are inserted, here with one on each longer side of the clamshell 102. After assembly, the mounts can provide for easy and reliable mounting of the module, such as inside the enclosure of a battery pack. The mounts fit inside slots on the clamshell and will be affixed using adhesive, which will be described in examples below. The mounts can be made from any suitable material, including, but not limited to, metal, polymer or a composite.

Figure 2:
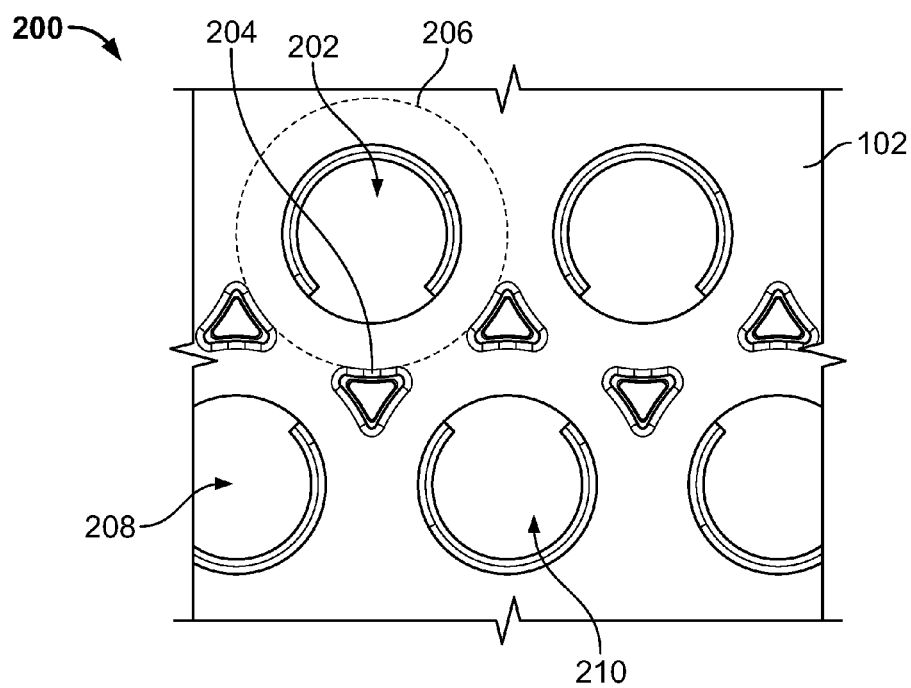
FIG. 2 shows an example of structure on the clamshell of FIG. 1.

FIG. 2 shows an example of structure 200 on the clamshell 102 of FIG. 1. First, the clamshell has an opening 202 for each of the cells. For example, the opening can be a through-hole to be used for interconnecting the cell. Second, the structure here includes three triangle shapes 204 that protrude slightly above the overall surface of the clamshell. In some implementations, the triangle shapes can have essentially a pyramid form in three dimensions.

Here, the triangle shapes 204 are positioned approximately on one half of a circle 206. The triangle shapes reflect the shape of an essentially cylindrical cell (e.g., cells of type 18650). In a sense, the circle as defined by the triangle shapes can be considered a counterbore for the cell (not shown). More particularly, the counterbore can be oversized relative to the footprint of the cell. As a result, the cell is not datumed to its position by the triangle shapes. Rather, the cell will be datumed by a thermal-exchange tube, and examples of this will be described below. However, when adhesive is applied to affix the cells to the clamshell 102, the adhesive will at least partially fill the gap between the side surface of the cell and the triangle shape. In other words, the structures on the clamshell can serve a role in the secure attachment of the cells. A triangle shape can serve as structure for two or more openings; for example, the triangle shape 204 also defines the respective counterbores for openings 208 and 210.

FIG. 3 shows an example of a thermal-exchange tube 300 assembled in the module housing 100 of FIG. 1. Here, the tube is an essentially flat conduit that is configured for transporting a liquid between rows of the cells (not yet assembled) so as to remove heat generated during battery operation, and thereby cool the cells, or heat up the cells to a desired operating temperature with a liquid heater (not shown). That is, the tube can also or instead provide heating. For example, the liquid can be circulated using a pump (not shown) at either end of the tube when cooling or heating is needed.

Figure 19:
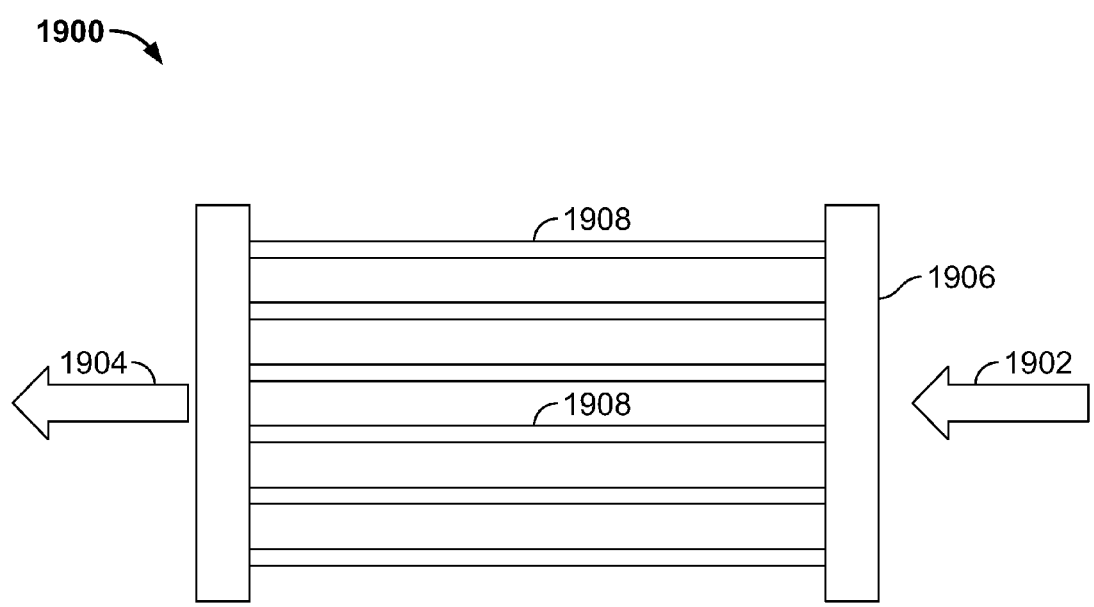
FIG. 19 shows an example of a parallel cooling tube system.

In some implementations, the tube can be datumed to the clamshell on the outer two runs. In between the outer runs, the tube can pass back and forth and reverse direction when it reaches the short end of the clamshell. As another example, rather than the tube reversing direction, separate parallel tubes can be provided, such as illustrated in FIG. 19 below. In this implementation, the tube is scalloped, and in a sense completes the counterbores (e.g., the half-circles defined by the triangle shapes 204 in FIG. 2).

FIG. 4 shows an example of the tube 300 of FIG. 3 running between rows of cells 400A-B assembled in the module housing. In assembly, the cells are populated into the counterbores. At that stage, the nominal position of the cells is flush with the scallops of the tube, but the cell position is not tightly controlled. The counterbore is oversized so as not to constrain the position of the cells.

One advantage of this assembly technique is that it allows for the use of cells of different types. In a worst-case scenario when there is cell-to-tube and tube-to-clamshell misalignment, the counterbores nevertheless provide enough clearance to avoid constraining the cells. For example, the positive ends of 18650-type cells by different manufacturers differ significantly from each other, as do the negative ends, but the diameters of the cell cans are nevertheless sufficiently similar that the tube 300 can be used with each of them.

Another advantage is that there is flexibility in the orientation of cells. For example, the cell 400A has its negative terminal facing upward, whereas for the cell 400B it is the positive terminal. That is, the module housing can be used with cells in an upward orientation, or a downward orientation, or some in each orientation.

FIG. 5 shows an example of a cell spreader element 500 between rows of the cells 400A-B from FIG. 4. That is, the cell spreader element is inserted so that it spaces apart, on the one hand, the row containing the cells 400A-B from, on the other hand, the row containing cells 502A-B. The cell spreader element biases each cell into position within the module, wherein the cell datums to the tube. The cell spreader can function as a thermal barrier to impede heat transfer between the cells. The cell spreader element can be made of any material suitable for spreading cells apart in the module housing, such as to provide enough side-force to readjust the cell to its proper position. In some implementations, the cell spreader element can be a fiberglass element, for example coated with polytetrafluoroethylene.

A contact angle 504 can be defined that indicates how much of the cell's cylindrical surface contacts the tube. This angle can depend on a number of characteristics, including, but not limited to, the cell radius, the forming of the tube, and the stiffness of the cell spreader element, to name just a few examples. Here, the contact angle is less than 90 degrees. For example, a contact angle of about 60-70 degrees can be used.

Figure 6:
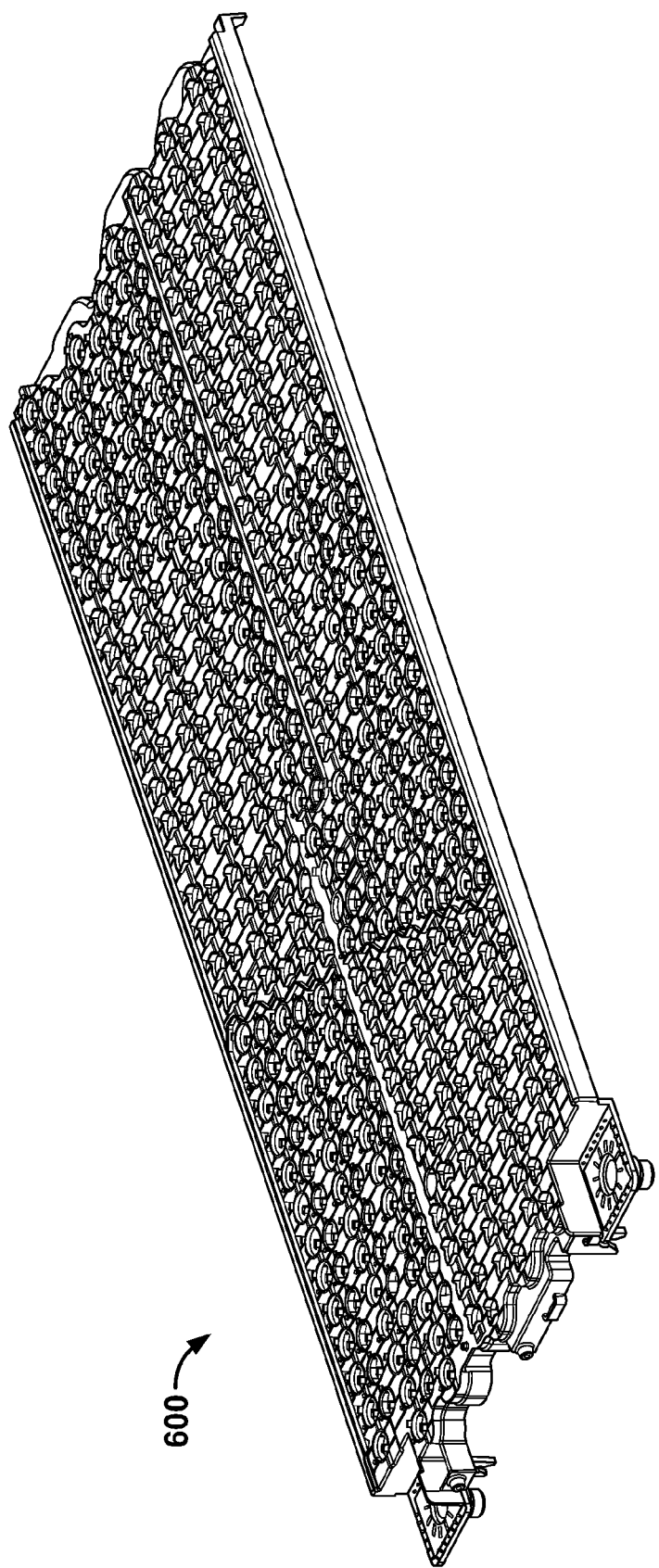
FIG. 6 shows an example of a second-side clamshell.

FIG. 6 shows an example of a second-side clamshell 600. In some implementations, the second-side clamshell 600 can be considered a "terminal side" clamshell. That is, the second-side clamshell 600 can be the complementary housing to the clamshell 102 (FIG. 1), for example to provide a top for the module when the cells have been assembled therein.

Figure 7:
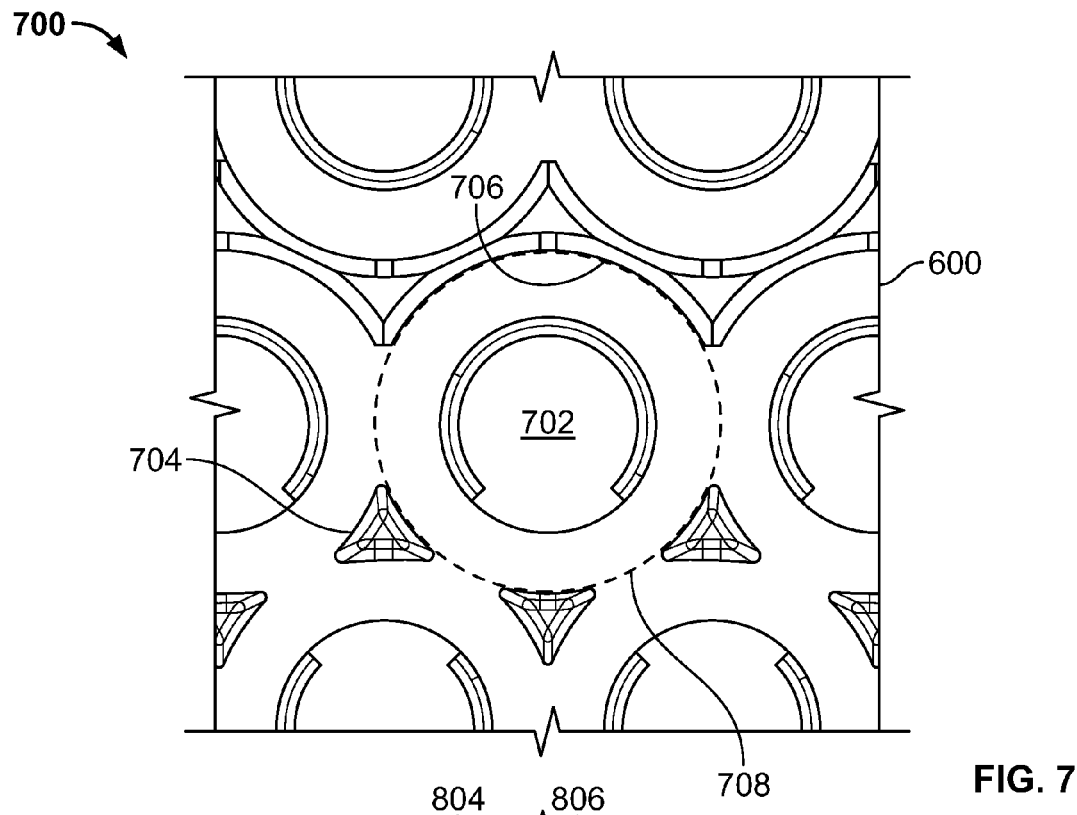
FIG. 7 shows structure on the clamshell of FIG. 6.

In some implementations, the second-side clamshell 600 can have one or more features identical or similar to those of the other clamshell. The second-side clamshell 600 can have structures that reflect the row-wise cell arrangement described above. FIG. 7 shows structure 700 on the second-side clamshell 600 of FIG. 6. For example, the structures here include an opening 702 for each of the cells, and three triangle shapes 704 that can be identical or similar to those of the other clamshell. The second-side clamshell 600 here also has structure 706, which together with the triangle shapes 704 forms a counterbore, as schematically indicated by a circle 708. Such counterbore can be oversized, in analogy with the above description of the counterbores in the lower clamshell. As another example, the second-side clamshell 600 can have one or more slots for attachment of a mount.

Figure 8:
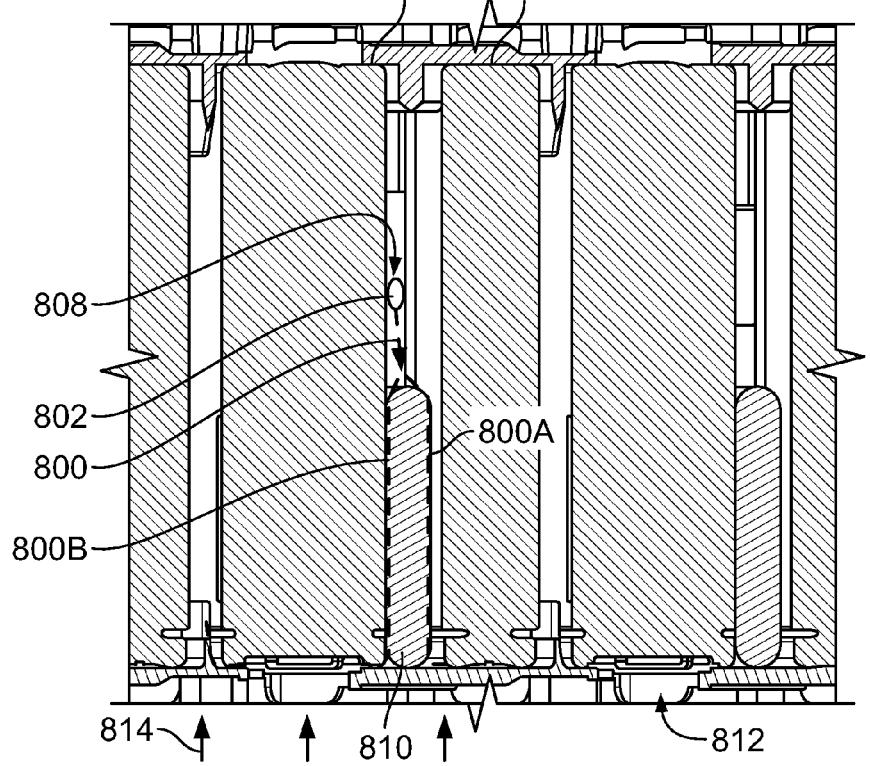
FIG. 8 schematically shows an example of applying adhesive to affix the thermal-exchange tube and the cells to the module housing.

FIG. 8 schematically shows an example of applying adhesive to affix the tube and the cells to the module housing. The adhesive is here schematically illustrated as a dashed line 800 that is dispensed by a stinger 802 between rows of cells 804 and 806. Each cell is offset along the length of the tube with regard to its neighbor (see, e.g., the cell pattern in FIGS. 4-5) and the cell 806 therefore appears narrower than the cell 804 in the current cross section. The stinger 802 can be an elongate nozzle configured to fit between the cell rows in a space that is here referred to as a stinger alley 808. For example, the stinger can begin at either end of the alley and thereafter be moved along the alley, continuously or in discrete steps, as the adhesive is being dispensed.

The adhesive 800 flows down toward the lower clamshell on both sides of tube 810. At the bottom of each cell is an opening 812 in the clamshell (e.g., opening 202 in FIG. 2). A measure can be taken to prevent the adhesive from flowing out the opening, or at least reduce the amount of such adhesive. In some implementations, a radiation-sensitive adhesive is used and radiation can then be applied below the module, as schematically indicated by arrows 814, to cure the adhesive. The clamshell(s) can be partially or fully transparent to such radiation. For example, a single or multi-component UV-cure acrylate or acrylate-epoxy adhesive can be used, and ultraviolet light can then be applied to prevent or reduce outflow of adhesive through the opening 812.

The adhesive wicks into the narrow space between cells and the tube, as illustrated by paths 800A and 800B. However, if the cell and/or the tube lacks significant transparency to the radiation, the paths 800A-B will essentially be shadowed during the radiation process. As a result, the adhesive that is present along the paths 800A-B could remain uncured (e.g., essentially liquid), significantly longer than that at the bottom of the cell. That is, the radiation may not be effective in curing the adhesive in such locations.

The adhesive can therefore be chosen so that it can also be cured by a measure other than radiation. In some implementations, the adhesive is curable also by one or more chemicals. For example, a two part adhesive can be mixed prior to dispensing and will chemically cure in the shadowed areas without radiation over time. The adhesive can also contain an aerobic or moisture cure mechanism such that the adhesive cures over time when exposed to air.

As a result, the adhesive is cured also in the areas corresponding to the paths 800A-B. The adhesive is more thermally conductive than the displaced interfacial air, and therefore provides an improved thermal interface between the individual cells and the tube. As such, the adhesive can be considered a thermal interface material that helps the tube transfer energy to and from the cells. That is, in some implementations a thermal interface material other than the adhesive (e.g., a silicon sponge material) need not be applied to the tube or the cells. Rather, the adhesive can perform also this function in addition to affixing the cells and the tube to each other and to the clamshell(s).

Figure 9:
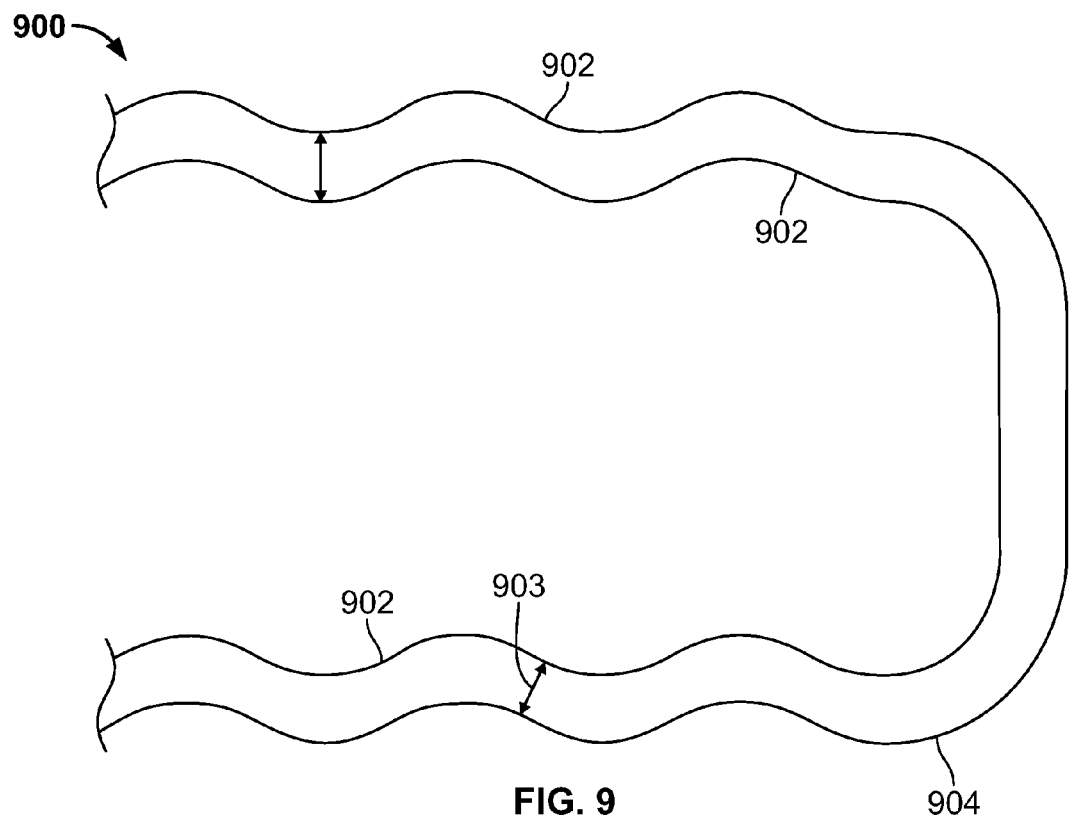
FIG. 9 shows an example of a thermal-exchange tube with scallops.

FIG. 9 shows an example of a tube 900 with scallops 902. In some implementations, the tube is extruded (e.g., from aluminum) in a straight shape, and the scallops are applied before the tube is bent into the necessary shape (e.g., to correspond to the rows of cells). For example, pressure can be applied on the side(s) of the tube, at a certain press tonnage, using a press. When the extrusion width is 3.0-5.0 mm, the scallop compression can be about 25%, to name just one example. A minimum scallop width is indicated by arrow 903. In these implementations, the scalloped tube is thereafter bent into shape, for example corresponding to bends 904 in one or more places on the tube. For example, scalloping can be performed everywhere on the tube except where the bends 904 are to be located. The bends 904 can correspond to the place where the tube arrives at the end of one row, and turns around to run down the next row.

Once finished, the tube 900 can be placed in the clamshell (e.g., as illustrated in FIG. 3) and thereafter the cells can be assembled into the rows defined by the tube. That is, the cells can be datumed to the tube, and not directly to any counterbore or other structure on the clamshell, to name just one example.

In other implementations, the bending can be done before the scalloping. For example, the tube 900 can be bent into the shape that corresponds to the intended cell rows of the clamshell—that is, with linear row portions separated by turns—and thereafter the row portions can be pressed into the scallop shape.

Figure 10A:
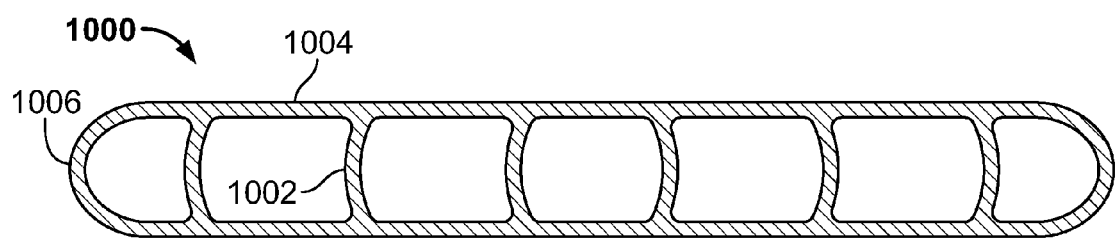
FIGS. 10A-F show example cross sections of thermal-exchange tubes.
Figure 10B:
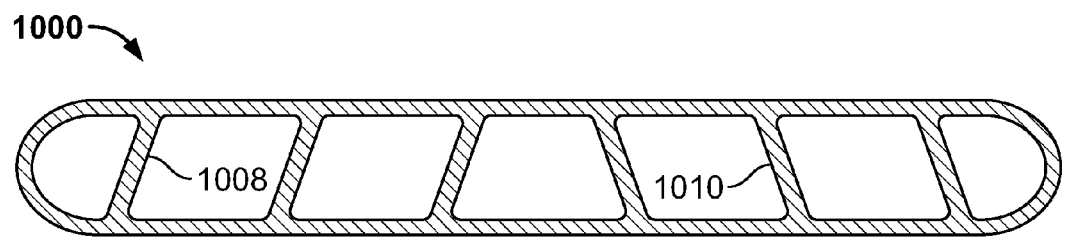

In some implementations, one or more internal features can be provided in a tube. FIGS. 10A-F show example cross sections of a tube 1000. In FIG. 10A, six pre-bent ribs 1002 are provided in the tube. That is, the tube has an elongate cross section with two essentially parallel main side surfaces 1004, and the pre-bent ribs 1002 connect the main side surfaces to each other. The internal ribs are non-perpendicular to the main side surfaces. In this example, each of the pre-bent ribs 1002 curves outward toward a nearest edge 1006 of the tube. Here, the pre-bent ribs have an outer radius essentially equal to the extrusion width.

Figure 10C:
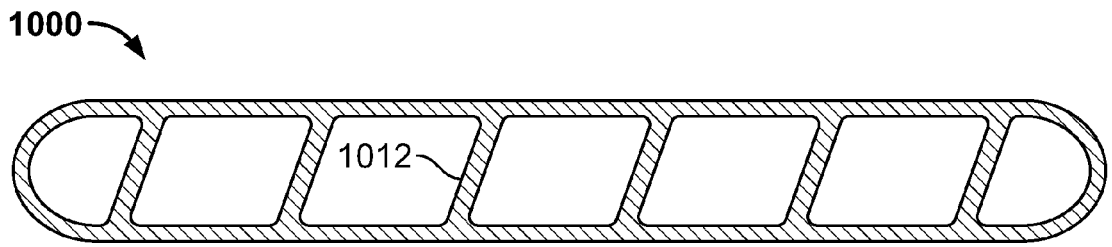

In some implementations, each of the internal ribs is straight and slanted relative to the main side surfaces. For example, in FIG. 10B the tube 1000 has ribs 1008 that are angled in one direction, and other ribs 1010 that are angled in another direction. In FIG. 10C, by contrast, the tube 1000 has ribs 1012 that are all angled in the same direction.

Figure 10D:
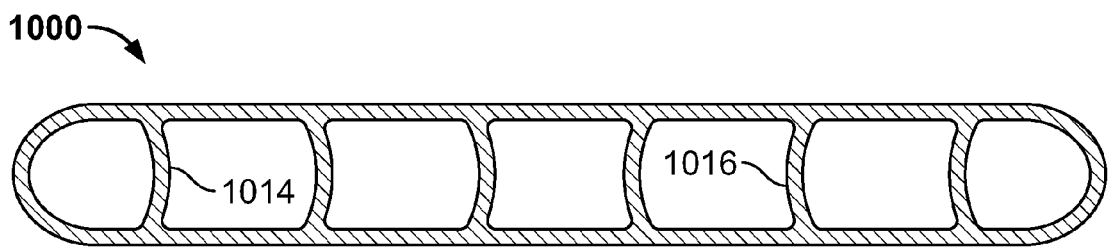
Figure 10E:
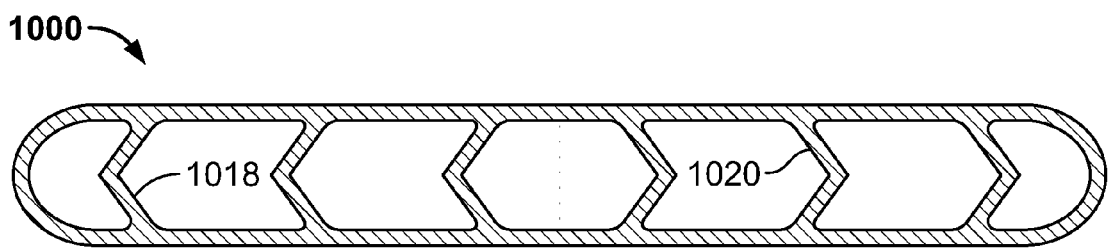
Figure 10F:
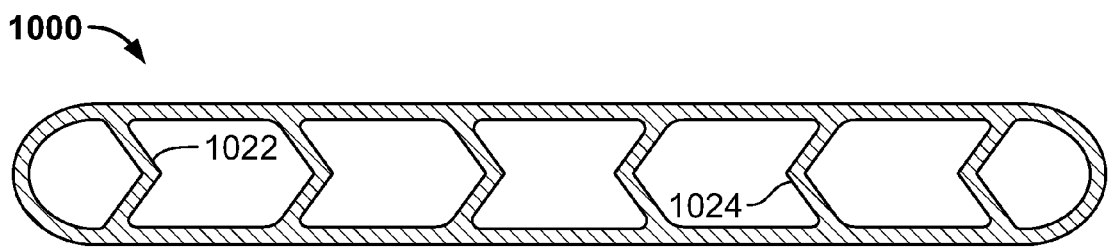

FIG. 10D shows an example where the tube 1000 has curved ribs 1014 that are oriented in one direction (i.e., concave toward the edge of the tube) and curved ribs 1016 that are oriented in another direction. In some implementations, one or more ribs in the tube 1000 has a knee. In FIG. 10E, ribs 1018 and 1020 are pointing away from each other (i.e., toward the edges of the tube), and in FIG. 10F ribs 1022 and 1024 are pointing toward each other.

In the illustrated examples, all ribs are curved or angled to the same degree. For example, in FIG. 10A the radius of the pre-bent ribs 1002 is the same for all of them, and in FIG. 10B the ribs 1008 and 1010 are all slanted at the same angle. In other implementations, one or more ribs can have a curvature and/or angle that is different from another rib.

The tube 1000 can be made from any material suitable for carrying one or more coolant liquids, for being affixed using the intended adhesive(s), and for having scallops formed therein. In some implementations, the tube is made from aluminum or a polymer. In some implementations the tube is composed of two or more separate parts such as an aluminum part used for coolant transport and a polymer part for electrical isolation. For example, the tube can be manufactured by an extrusion process. In the case of a polymer tube, other manufacturing methods such as blow molding can be used.

Figure 11:
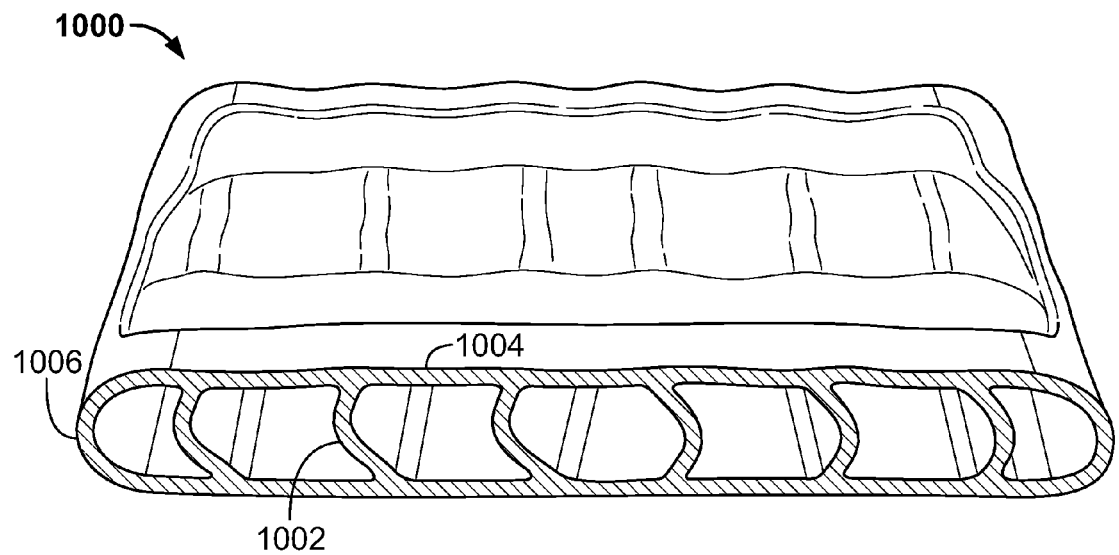
FIG. 11 shows a cross section of an example deformation of the thermal-exchange tube in FIG. 10A.

When the tube 1000 is bent into the configuration that it needs to have for the particular clamshell, one or more of the internal features can be bent or otherwise deformed as a result. FIG. 11 shows a cross section of an example deformation of the tube 1000 as it was shown in FIG. 10A. That is, the tube was first bent in at least one place, and the current illustration shows the interior of the tube where it was bent. Here, the main side surfaces 1004 and the edges 1006 are essentially unaffected by the bending. However, some or all of the pre-bent ribs 1002 has been further bent or otherwise deformed. For example, the pre-bent ribs can flex at their midpoints and yield in a consistent, predictable way with low force. This can provide a more controlled rib collapse, for example when the tube is being bent.

Figure 12:
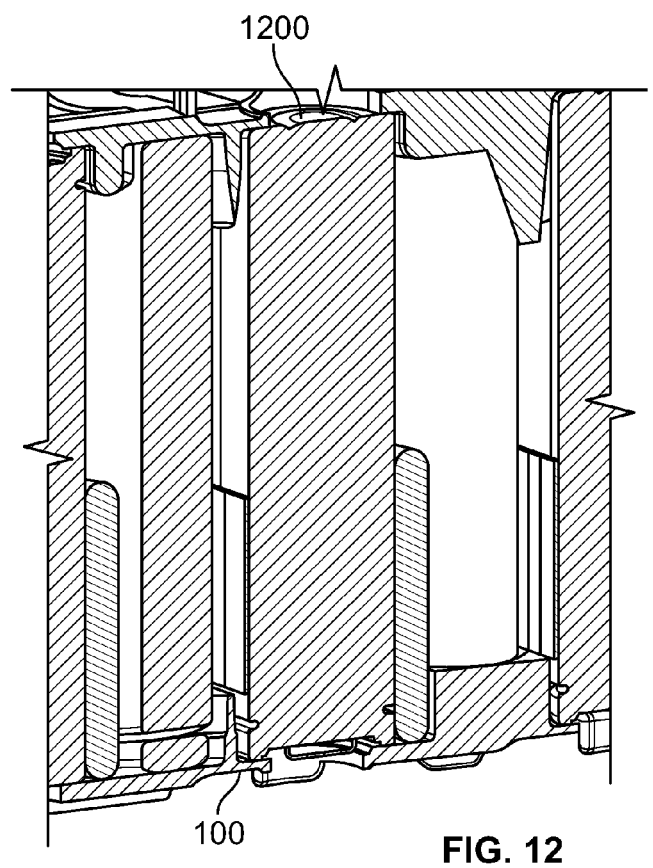
FIG. 12 shows that a cell datums to the module housing along a z-axis.

FIG. 12 shows that a cell 1200 datums to the module housing 100 along a z-axis. That is, the cell is positioned vertically by the clamshell.

Figure 13:
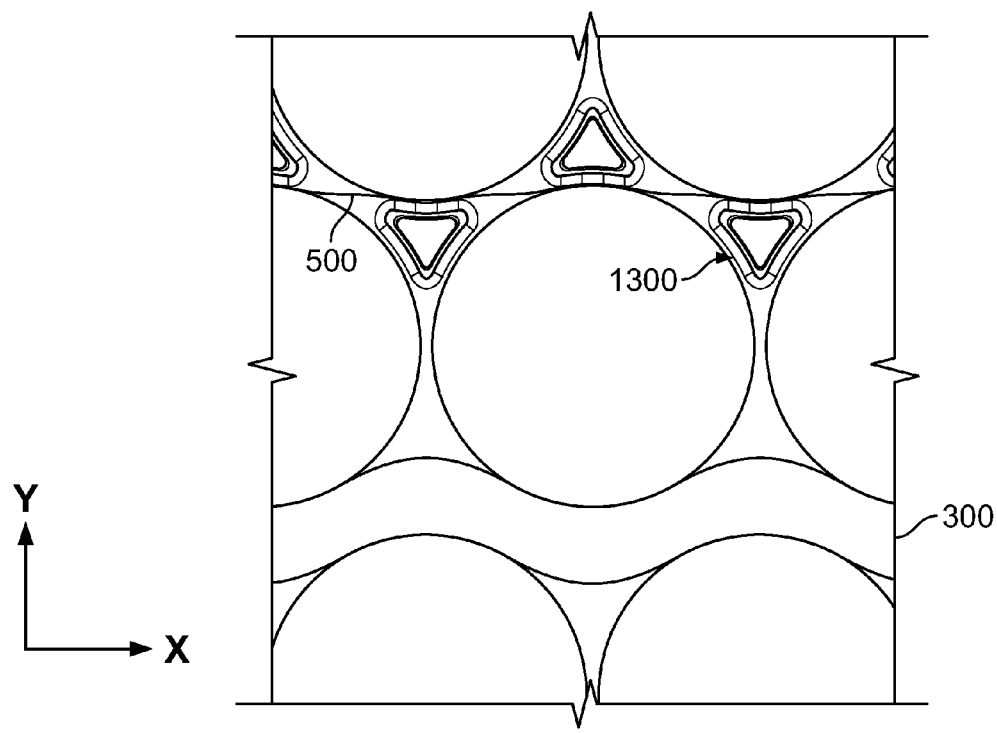
FIG. 13 shows that a cell datums to the thermal-exchange tube along x- and y-axes.

FIG. 13 shows that a cell 1300 datums to the tube 300 along x- and y-axes. That is, the cell is positioned horizontally by the tube and, in this example, the cell spreader element 500. For example, this datuming is reflected by a relatively large cell-to-clamshell clearance 1300. When adhesive is applied, it can partially or completely fill the cell-to-clamshell clearance.

Figure 14:
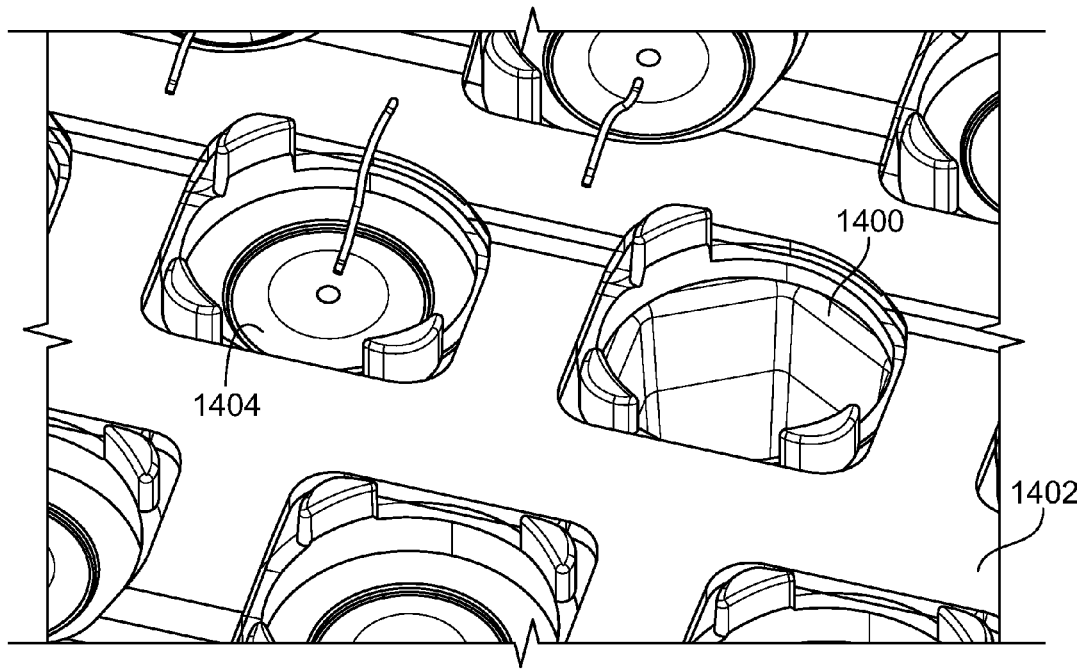
FIG. 14 shows an example of using a placeholder to reduce battery pack capacity.

FIG. 14 shows an example of using a placeholder 1400 to reduce battery pack capacity. From a marketing perspective, it can be advantageous to offer multiple levels of battery capacity in a battery pack that has the same overall form factor. This allows for the reuse of many battery pack components and leveraging the testing and validation but still providing different battery capacities and costs. For example, this can allow a manufacturer to offer the customer the option of purchasing the same vehicle with either a standard battery capacity or an extended battery capacity.

A clamshell 1402 here shows that multiple cells 1404 have been assembled within the module housing. The placeholder 1400, however, is a non-energy element that is inserted instead of one of the cells 1404. For example, this can be used to reduce the capacity of the battery pack while maintaining structural integrity. The placeholder can be a generic piece that interfaces with the clamshells in the z-dimension, and with the tube (obscured) in the x- and y-dimensions. For example, use of the placeholder can prevent adhesive seepage via the cell interconnect through hole in the lower clamshell.

As another example, flexibility in cell positioning can be provided. If clamshell counterbores are oversized in the x- and y-dimensions, and contain no features that interface with particular cell geometry, then the cell can be inverted within the same module housing. For example, the clamshell may have through holes (e.g., the opening 202 in FIG. 2) that are intended for electrically interconnecting the cells to each other or to another component, and such through holes can be essentially the same diameter for both positive and negative cell terminals. This clamshell configuration can provide a hole diameter that is adequate both for exposing the bottom vent on the cell's negative terminal, and for providing room for the positive cell terminal to slightly protrude, without crashing with the structure that forms the through hole. For example, this can provide for polarity switch at any time, such as due to programmatic changes or physical packaging needs without having to redesign the module or making a major change in the module factory.

Figure 15:
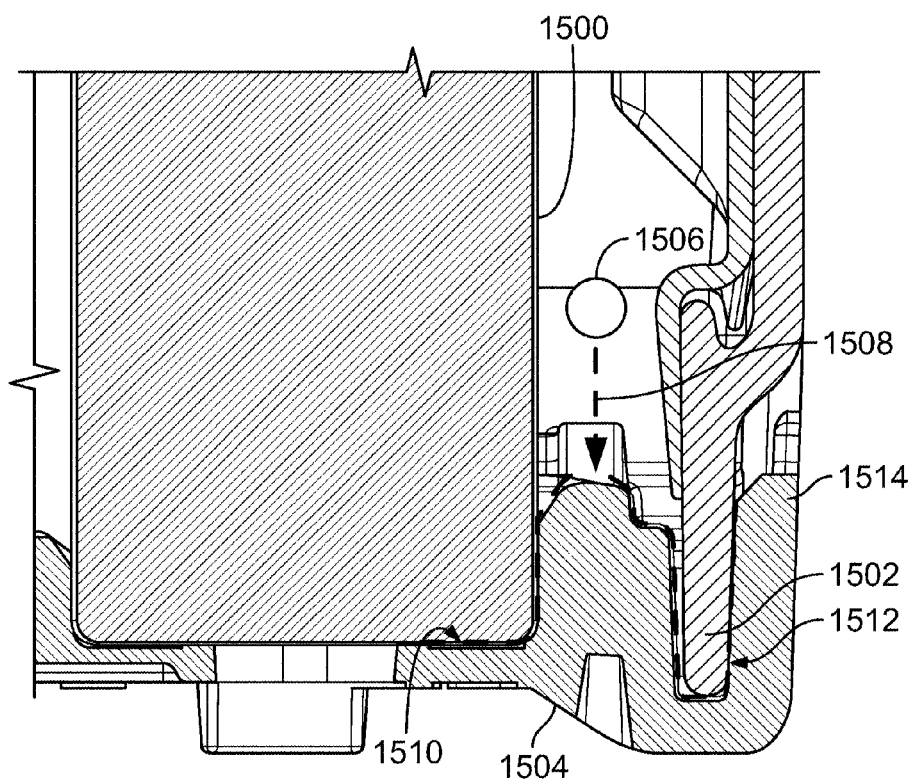
FIG. 15 shows an example of applying adhesive to affix a cell and a mount to a clamshell.

FIG. 15 shows an example of applying adhesive to affix a cell 1500 and a mount 1502 to a clamshell 1504. Here, the adhesive is applied using a stinger 1506. The flow of adhesive is generally indicated by an arrow 1508. The adhesive wicks into places that are not easily reached by mechanical equipment. For example, the adhesive reaches an area 1510 underneath the cell, and also an area 1512 that is shielded by the flange of the mount 1502. As such, the application of the adhesive here serves both to affix the cell and to affix the mount to the module housing (e.g., to the clamshell). Similar to examples described above, the adhesive can be cured in a multi-step process: radiation such as UV light can be applied, and a chemical reagent, or an aerobic or moisture cure mechanism can provide curing in areas that were shadowed when the radiation was applied.

The above technique can provide advantageous datuming of the mount 1502. In some implementations, the tube (or any material applied to its outside) can set the mount against a datum rib 1514 on the clamshell 1504. For example, this can datum the mount in the x-direction. Another rib (to be exemplified below) can datum the mount in other directions.

Figure 16:
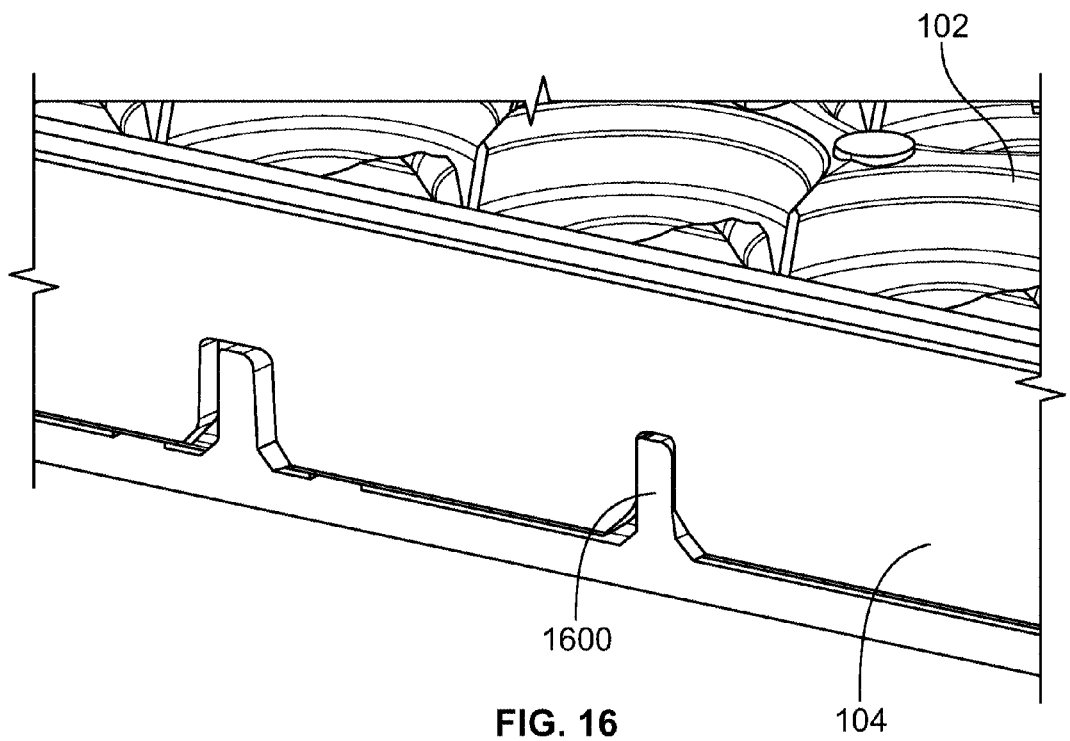
FIG. 16 shows an example of the mount of FIG. 1 being positioned using ribs in the clamshell.

FIG. 16 shows an example of the mount 104 of FIG. 1 being positioned using ribs 1600 in the clamshell 102. In this cross section, it can be seen how the ribs 1600 datum the mount in the y- and z-directions. For example, in the y-direction the datuming ensures that the mount is properly positioned along the length of the clamshell and does not extend too far on either side. As another example, in the z-direction the datuming ensures that the mount sits at a proper depth inside the slot of the clamshell (e.g., high enough to allow proper wicking of adhesive, yet low enough to ensure a stable bonding by the adhesive).

Figure 17:
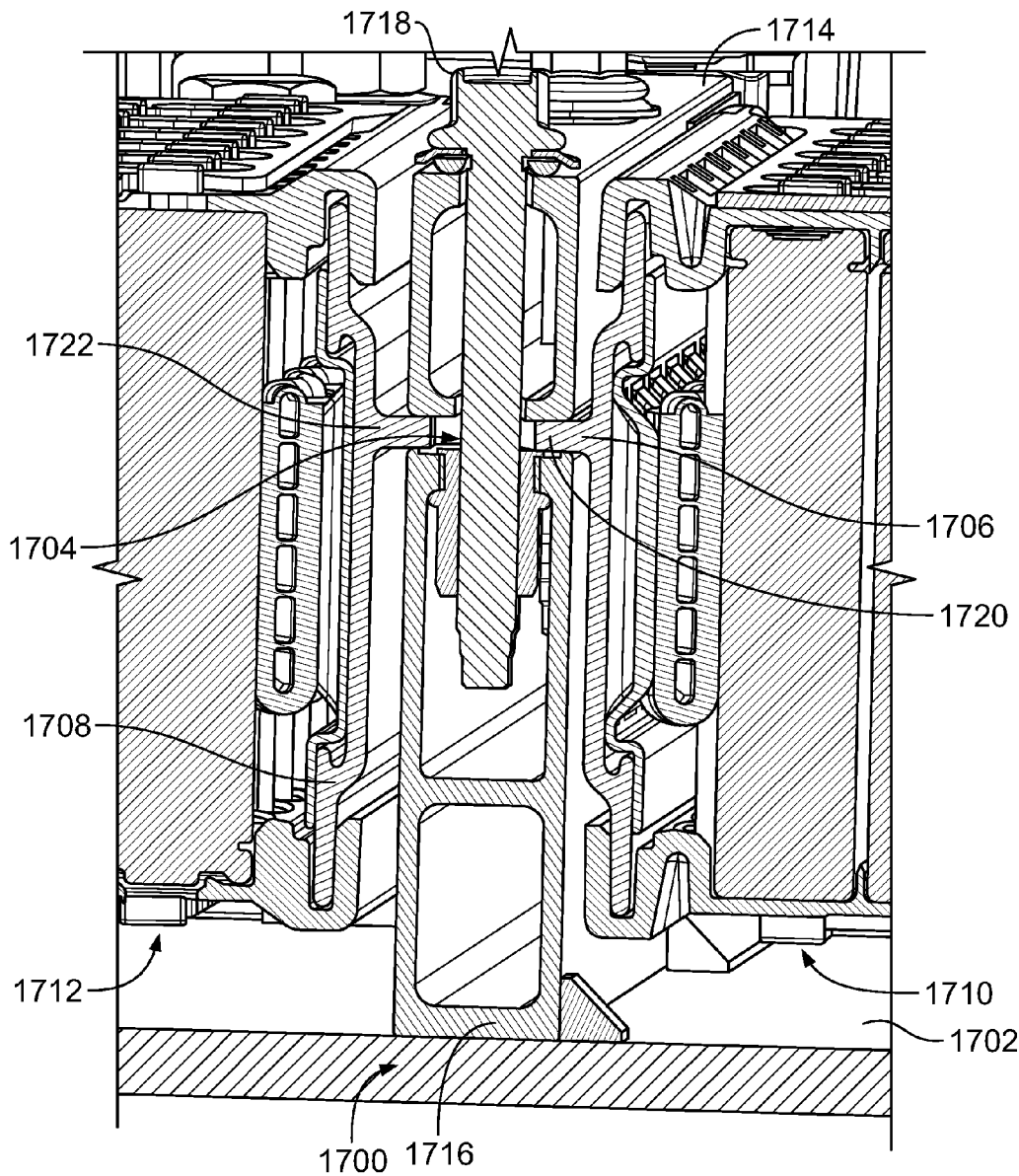
FIG. 17 shows an example of a member of a battery pack having a cross-member split for receiving mounts from cell modules.

FIG. 17 shows an example of a member 1700 of a battery pack 1702 having a cross-member split 1704 for receiving mounts 1706 and 1708 from cell modules 1710 and 1712. For example, the member 1700 can be a cross-member of a battery pack, wherein multiple cell modules are mounted inside the battery pack, in at least one bay, using one or more cross-members. Here, the member comprises an upper portion 1714 and a lower portion 1716, attached to each other by fastener 1718. This design creates the split 1704 where one or more flanges 1720 and 1722 can rest on the lower portion 1716.

One advantage of this arrangement is that modules in adjacent bays share the fastener 1718 and can be packed with higher volumetric energy density. The split 1704 can be approximately level with the centers of mass of the modules 1710 and 1712 (e.g., the center of mass for a module housing, a thermal-exchange tube, cells and adhesive) in some implementations. This can reduce the stress imparted on the interface between the mount and the clamshell during mechanical loading.

Figure 18:
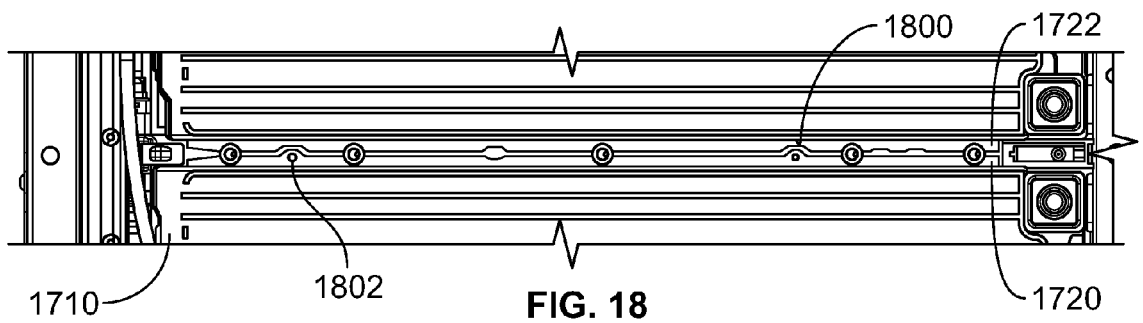
FIG. 18 shows an example elevated view of the mounts in FIG. 17.

FIG. 18 shows an example elevated view of the mounts in FIG. 17. Here, the upper portion 1714 (FIG. 17) of the member has not yet been put in place, and the flanges 1720 and 1722 are therefore visible. Each of the flanges has profile features 1800 that may interface with a corresponding feature on the other flange. By this design, the mounting flanges can be considered "half-width" in that a single upper cross-member can simultaneously fasten mounts of modules from adjacent bays. For example, the module 1710 that is here shown having the flange 1720, can on its other end have a flange corresponding to the flange 1722, in analogy with the above.

One or more pins 1802 can position the module on the lower cross-member during assembly. In some implementations, the pin passes through an opening on the flange of the mount. For example, this can allow electrical and coolant connections to be made to the modules before the module is mechanically restrained by the upper cross-member.

In at least some of the above examples the adhesive that attaches the cells and the tube to the clamshell also serves as a thermal interface material between the cells and the tube. Some implementations may not include this feature. Some implementations can provide a multi-step adhesion process wherein an adhesive is cured using at least radiation and a chemical cure mechanism. For example, such implementations include a method comprising: assembling a thermal-exchange tube in a module housing for an energy storage pack; assembling cells in the module housing, wherein the thermal-exchange tube runs between rows of the cells; applying an adhesive that affixes the cells and the thermal-exchange tube to the module housing; applying radiation that cures a first portion of the adhesive, wherein a second portion of the adhesive is shielded from the radiation by the cells or the thermal-exchange tube; and using a chemical cure mechanism to cure at least the second portion of the adhesive. As another example, such implementations include an energy storage pack comprising: a module housing; cells; and a thermal-exchange tube running between rows of the cells, the cells and the thermal-exchange tube affixed to the module housing by the adhesive, wherein a first portion of the adhesive is cured by applied radiation, wherein a second portion of the adhesive is shielded from the radiation by the cells or the thermal-exchange tube, and wherein the second portion of the adhesive is cured by a chemical cure mechanism. Each of the example method and energy storage pack mentioned above can include any other feature described herein.

FIG. 19 shows an example of a parallel cooling tube system 1900. Here, liquid for thermal exchange (e.g., a coolant) enters the thermal exchange area generally as indicated by arrow 1902, and exits generally as indicated by arrow 1904. In some implementations, one or more manifolds 1906 can be provided for the liquid. For example, one manifold can distribute the incoming liquid among multiple tubes 1908, and another manifold can collect the separate flows as the liquid exits the thermal exchange area.

A number of implementations have been described as examples. Nevertheless, other implementations are covered by the following claims.

What is claimed is:

1. A method comprising:
    assembling a thermal-exchange tube in a module housing for an energy storage pack;
    assembling a mount in a slot on an edge of the module housing;
    attaching the module housing to a member of the energy storage pack using a flange on the mount;
    assembling cells in the module housing, wherein the thermal-exchange tube runs between rows of the cells;
    applying an adhesive that affixes the cells and the thermal-exchange tube to the module housing and that affixes the mount to the module housing;
    curing a first portion of the adhesive by radiation, wherein a second portion of the adhesive is shielded from the radiation by the cells or the thermal-exchange tube; and
    curing at least the second portion of the adhesive by a chemical cure mechanism.

2. The method of claim 1, wherein the adhesive is an acrylate epoxy adhesive.

3. The method of claim 1, wherein the thermal-exchange tube is a scalloped thermal-exchange tube, wherein the cells datum to the module housing by the scalloped thermal-exchange tube and not by the module housing.

4. The method of claim 3, further comprising adding a cell spreader element between at least some adjacent cells.

5. The method of claim 1, further comprising positioning the mount on the module housing using ribs in the slot.

6. The method of claim 1, wherein the member has a split to accommodate at least the flange, and wherein the split is level with a center of mass for the assembly of the module housing, the thermal-exchange tube, the cells and the adhesive.

7. The method of claim 6, further comprising providing a crumple zone between the module housing and an enclosure of the energy storage pack.

8. An energy storage pack comprising:
    a module housing;
    cells; and
    a thermal-exchange tube running between rows of the cells, wherein the cells and the thermal-exchange tube are affixed to the module housing by an adhesive, a first portion of the adhesive being cured by applied radiation, wherein a second portion of the adhesive is shielded from the radiation by the cells or the thermal-exchange tube, and wherein the second portion of the adhesive is cured by a chemical cure mechanism, wherein the module housing includes structure having three triangle shapes on one half of a footprint of each cell and that is oversized relative to the cells, and wherein the adhesive fills gaps between the cells and the structure in affixing the cells to the module housing.

9. The energy storage pack of claim 8, wherein the thermal-exchange tube is a scalloped thermal-exchange tube, and wherein the cells datum to the module housing by the scalloped thermal-exchange tube and not by the module housing, the energy storage pack further comprising a cell spreader element added between at least some adjacent cells.

10. The energy storage pack of claim 8, wherein the thermal-exchange tube has an elongate cross section with two essentially parallel main side surfaces, and wherein the thermal-exchange tube has internal ribs that connect the main side surfaces to each other, wherein the internal ribs are non-perpendicular to the main side surfaces.

11. The energy storage pack of claim 10, wherein each of the internal ribs curves outward toward a nearest edge of the thermal-exchange tube.

12. The energy storage pack of claim 10, wherein each of the internal ribs is straight and slanted relative to the main side surfaces.

13. The energy storage pack of claim 8, wherein the thermal-exchange tube is made of aluminum or a polymer.

14. The energy storage pack of claim 8, wherein the module housing is configured to accept at least two different types of cells.

15. The energy storage pack of claim 8, wherein the module housing is configured to have non-energy placeholders instead of some of the cells which reduces a capacity of the energy storage pack.

16. The energy storage pack of claim 8, wherein the module housing is configured to receive at least some of the cells in each of multiple alternative orientations.

17. The energy storage pack of claim 8, wherein the energy storage pack is configured to be positioned on a lower cross-member of an enclosure, and wherein the energy storage pack is held in place by at least one pin before the energy storage pack is mechanically restrained by an upper cross-member.

\* \* \* \* \*